United States Patent
Griffin

(10) Patent No.: US 7,697,941 B2
(45) Date of Patent: Apr. 13, 2010

(54) UPDATING PRESENCE IN A WIRELESS COMMUNICATIONS DEVICE

(75) Inventor: Jeffrey Jason Griffin, Raleigh, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 923 days.

(21) Appl. No.: 11/195,289

(22) Filed: Aug. 2, 2005

(65) Prior Publication Data

US 2007/0032194 A1  Feb. 8, 2007

(51) Int. Cl.
*H04Q 7/20* (2006.01)

(52) U.S. Cl. ............. 455/456.1; 455/41.2; 455/404.2; 455/456.2; 455/435.1; 455/412.1; 455/412.2; 379/220.01

(58) Field of Classification Search ........... 455/456.1, 455/41.2, 412.1, 412.2, 404.2, 435.1, 433, 455/456.2
See application file for complete search history.

(56) References Cited

U.S. PATENT DOCUMENTS

| | | | | |
|---|---|---|---|---|
| 6,735,287 B2 * | 5/2004 | Vishik et al. | ............. | 379/88.02 |
| 6,757,722 B2 * | 6/2004 | Lonnfors et al. | ............. | 709/220 |
| 6,968,179 B1 * | 11/2005 | De Vries | .................. | 455/414.1 |
| 7,020,480 B2 * | 3/2006 | Coskun et al. | ............. | 455/466 |
| 7,043,226 B2 * | 5/2006 | Yamauchi | .................. | 455/405 |
| 7,062,253 B2 * | 6/2006 | Money et al. | ............. | 455/406 |
| 7,103,333 B2 * | 9/2006 | Lazaridis et al. | .......... | 455/412.1 |
| 7,110,773 B1 * | 9/2006 | Wallace et al. | ........... | 455/456.1 |
| 7,170,863 B1 * | 1/2007 | Denman et al. | ............. | 370/260 |
| 7,190,948 B2 * | 3/2007 | Donley et al. | ............... | 455/411 |
| 7,209,740 B2 * | 4/2007 | Bahl et al. | ................... | 455/434 |
| 7,224,966 B2 * | 5/2007 | Caspi et al. | ................. | 455/419 |
| 7,245,936 B2 * | 7/2007 | Bahl et al. | ............... | 455/553.1 |
| 7,274,940 B2 * | 9/2007 | Kyperountas et al. | .... | 455/456.1 |
| 7,277,719 B2 * | 10/2007 | Klassen et al. | .............. | 455/466 |
| 7,283,850 B2 * | 10/2007 | Granovetter et al. | ........ | 455/570 |
| 7,310,532 B2 * | 12/2007 | Knauerhase et al. | ...... | 455/456.1 |
| 7,412,247 B2 * | 8/2008 | Hughes | .................. | 455/456.1 |

(Continued)

FOREIGN PATENT DOCUMENTS

EP  1 164 808  12/2001

OTHER PUBLICATIONS

"Wireless Village: The Mobile IMPS Initiative Features and Functions version 1.1," Ericsson, Motorola and Nokia, 2002, XP-002345674.

(Continued)

*Primary Examiner*—Marceau Milord
(74) *Attorney, Agent, or Firm*—Coats & Bennett, P.L.L.C.

(57) ABSTRACT

A wireless communications device that sends and receives presence status information is configured to detect when it is proximate a predefined zone. A receiver in the wireless communications device receives presence information from a transmitter associated with the predefined zone. The presence information defines a new presence status for the wireless communications device, and may include an indicator associated with the new presence status. Upon receipt of the presence information, a controller in the wireless communications device automatically changes the current presence status of the wireless communications device to the new presence status, and publishes the changed status to a remote entity. If the new presence status is not defined in memory, the controller may add the new presence status to memory.

13 Claims, 4 Drawing Sheets

U.S. PATENT DOCUMENTS

| | | | |
|---|---|---|---|
| 2002/0035605 A1* | 3/2002 | McDowell et al. | 709/206 |
| 2003/0018704 A1* | 1/2003 | Polychronidis et al. | 709/202 |
| 2003/0060211 A1* | 3/2003 | Chern et al. | 455/456 |
| 2003/0065788 A1 | 4/2003 | Salomaki | |
| 2003/0104819 A1* | 6/2003 | Knauerhase et al. | 455/456 |
| 2003/0154293 A1* | 8/2003 | Zmolek | 709/228 |
| 2004/0005886 A1* | 1/2004 | Oda et al. | 455/422.1 |
| 2004/0059781 A1* | 3/2004 | Yoakum et al. | 709/204 |
| 2004/0122901 A1* | 6/2004 | Sylvain | 709/206 |
| 2004/0125941 A1* | 7/2004 | Yoakum | 379/266.02 |
| 2004/0186909 A1 | 9/2004 | Greenwood | |
| 2004/0203894 A1* | 10/2004 | Watanabe et al. | 455/456.1 |
| 2004/0203903 A1* | 10/2004 | Wilson et al. | 455/456.1 |
| 2004/0266398 A1* | 12/2004 | Adamczyk et al. | 455/412.1 |

OTHER PUBLICATIONS

International Search Report, International Application No. PCT/US2006/007876, Mailed Jun. 20, 2006.

H. Schulzrinne, U. Columbia, V. Gurbani, P. Kyzivat, J. Rosenberg, "RPID: Rich Presence Extensions to the Presence Information Data Format (PIDF)", Jun. 2, 2005, pp. 1-32, http://www.ietf.org/internet-drafts/draft-ietf-simple-rpid-06.txt.

* cited by examiner

UPDATING PRESENCE IN A WIRELESS COMMUNICATIONS DEVICE

BACKGROUND

The present invention relates generally to wireless communications devices, and particularly to wireless communications devices having session based text or video messaging capabilities.

Instant messaging allows users to send and receive text messages by establishing communications sessions. Historically, users have sent and received instant messages using a personal computer connected to the Internet. Given its popularity, however, it is no surprise that instant messaging has now moved to the realm of the wireless communications network. Users in both worlds can now send and receive text messages; however, the concept of "presence" was modified slightly for mobile users.

"Presence" is a service that allows a user to inform other users about his reachability, availability, and willingness to communicate. The presence service indicates a user's presence status, for example, whether users are on-line, off-line, idle, busy, or on the phone. In addition, the presence service may provide information about a user's means and capabilities to send and receive some types of data such as video, audio, and text messages. A user who wishes to be kept informed of another user's presence status is referred to as a "watcher." A user who informs the watcher of his or her presence status is referred to as a "presentity."

Typically, watchers who wish to be kept informed of a particular presentity's status subscribe to a presence server in a network. In some systems that use the Session Initiation Protocol (SIP) for signaling, watchers may send a SUBSCRIBE message as is known in the art. The subscription acts as a standing request to notify the watcher of the presentity's current presence status (e.g., on-line to off-line) and when it changes. When the presentity's status changes, the presentity notifies the presence server. The presence server than publishes the status change to the watcher.

However, presence under the current paradigm does not always accurately indicate the presence status of a mobile user. More particularly, current presence services indicate a person's ability to respond to received messages. This is because presence under the current paradigm is based on the generally "fixed" physical location of the computer. A user who is logged on to a desktop computer and able to respond to messages, for example, may be indicated as being "Active," or "Online," while a user who is logged off may be indicated as being "Offline." Still, other presence information lets users know which people are "Inactive," or "Idle" (i.e., away from the computer keyboard). Mobile users, however, generally do not remain in "fixed" positions and are not tethered to a particular desktop computer. Thus, a mobile user's status or ability to respond is implied by the location and/or an activity of the mobile user.

To date, some modifications to the presence service have been made to better comport with the specific needs of mobile users. However, not all needs have been addressed.

SUMMARY

In one embodiment of the present invention, a wireless communications device comprises a short-range transceiver, memory, and a controller. The short-range transceiver detects when the wireless communications device is proximate some predefined zone, and receives presence information from a transmitter associated with the predefined zone. The received presence information defines a new presence status for the wireless communications device. The new presence status may be associated with the predefined zone. The presence information may include, for example, an indicator that designates the new presence status.

Upon receipt of the presence information from the transmitter, the controller automatically updates the current presence status of the wireless communications device to the new presence status. The controller also publishes the new status to a remote entity (e.g., a presence server or subscriber) via a wireless communications network. The controller may also check to determine whether the new presence status received from the transmitter is already defined in memory of the wireless communications device. If the new presence status is not defined in memory, the controller may add the new presence status to memory.

DETAILED DESCRIPTION

The present invention comprises a wireless communications device that changes and publishes a user's presence status responsive to a received signal that designates a new presence status for the wireless communications device. As used herein, the term "wireless communication device" may include a cellular radiotelephone, a Personal Communication System (PCS) terminal, a Personal Digital Assistant (PDA) that can include a radiotelephone, Internet/intranet access, web browser, organizer, calendar, and/or a global positioning system (GPS) receiver, a conventional laptop and/or palmtop receiver, or other appliance or mobile station that includes a radiotelephone transceiver.

Figure 1:
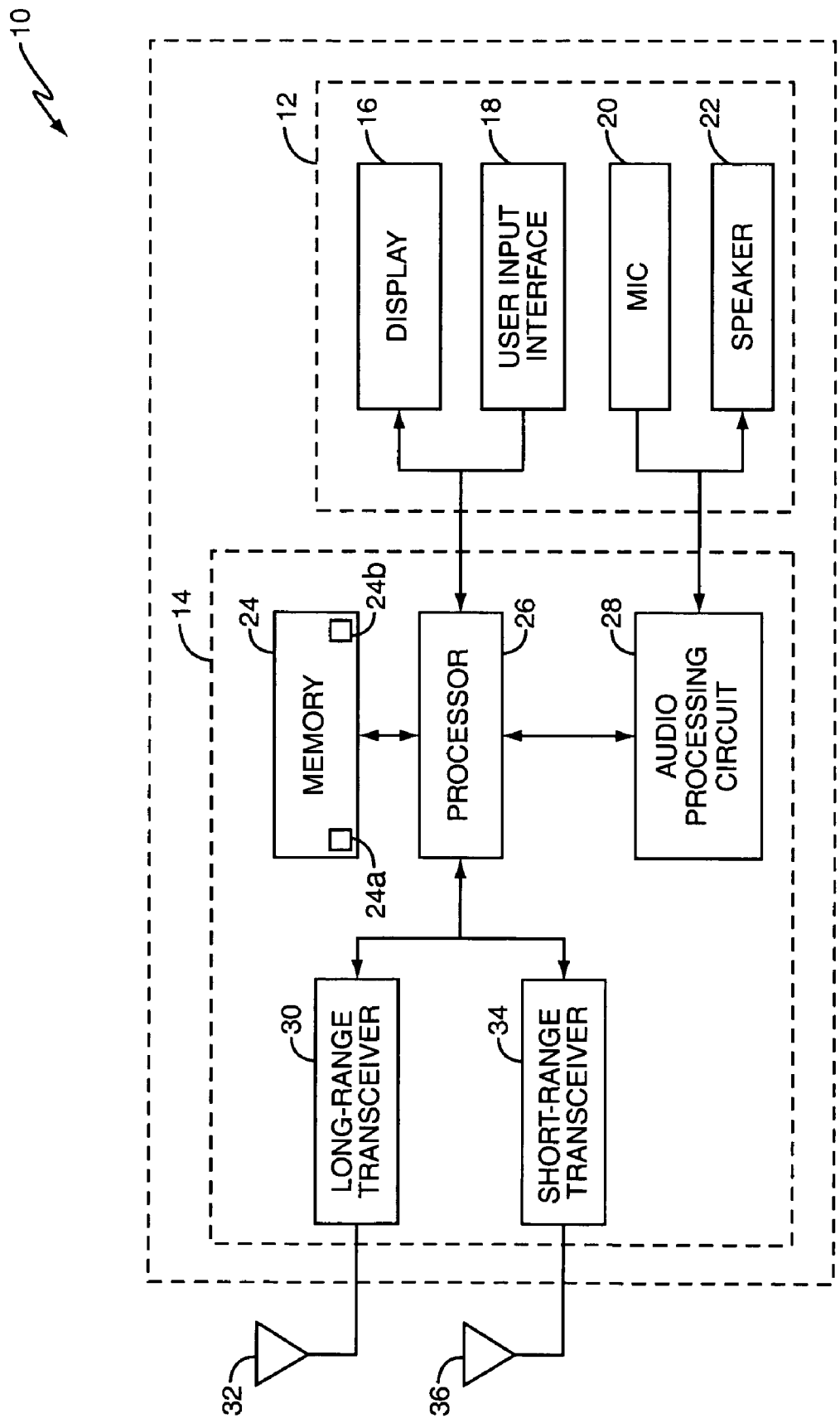
FIG. 1 illustrates a wireless communications device configured according to one embodiment of the present invention.

Turning now to the drawings, FIG. 1 illustrates a wireless communication device 10 configured according to one embodiment of the present invention. Wireless communication device 10 includes a user interface 12 and a communications interface 14. User interface 12 includes a display 16, a user input interface 18, a microphone 20, and a speaker 22. User interface 12 generally permits the user to interact with and control wireless communication device 10. Display 18, which may comprise an LCD display or a touch screen, for example, allows a user to view information such as menus and menu items, dialed digits, images, call status information, and output from user applications. User input interface 18 may include input devices such as a keypad, touchpad, joystick control dials, control buttons, other input devices, or a combination thereof. The user input interface 18 allows the user to dial numbers, enter commands, scroll through menus and menu items presented to the user on display 18, and make selections. Microphone 20 receives and converts audible signals, such as the user's detected speech and other audible sound, into electrical audio signals that may be processed by audio processing circuit 28. Speaker 22 receives analog audio signals from audio processing circuit 28, and converts them into audible sound that the user can hear.

Communications circuitry 14 includes, inter alia, the components necessary to allow a user to communicate with one or more remote parties via a communications link. Communications circuitry 14 comprises memory 24, a controller 26, an audio processing circuit 28, a long-range transceiver 30 coupled to an antenna 32, and a short-range transceiver 34 coupled to an antenna 36. Memory 24 represents the entire hierarchy of memory in wireless communications device 10, and may include both random access memory (RAM) and read-only memory (ROM). Computer program instructions and data required for operation are stored in non-volatile memory, such as EPROM, EEPROM, and/or flash memory, and may be implemented as discrete devices, stacked devices, or integrated with controller 26. As will be described in more detail later, memory 24 may store a user agent application 24a that publishes user presence information to one or more remote entities. Memory 24 may also include a presence status table 24b that stores the presence statuses.

Controller 26 controls the operation of wireless communications device 10 according to programs and/or data stored in memory 24. The control functions may be implemented in a single microprocessor, or in multiple microprocessors. Suitable processors may include, for example, both general purpose and special purpose microprocessors. Controller 26 may interface with audio processing circuit 28, which provides basic analog output signals to speaker 22 and receives analog audio inputs from microphone 20. In addition, controller 26 may also interface with short-range transceiver 34 to receive presence information, and with long-range transceiver 30 to publish the presence information.

Long-range transceiver 30 and antenna 32 allow a user to communicate wireless signals to and from a base station in a wireless communications network. Long-range transceiver 30 may be a fully functional cellular radio transceiver that operates according to any known standard, including the standards known generally as the Global System for Mobile Communications (GSM), TIA/EIA-136, cdmaOne, cdma2000, UMTS, and Wideband CDMA. In addition, long-range transceiver 30 may include baseband-processing circuits to process the transmitted and received signals. Alternatively, however, baseband-processing circuits may be incorporated in controller 26.

Figure 2:
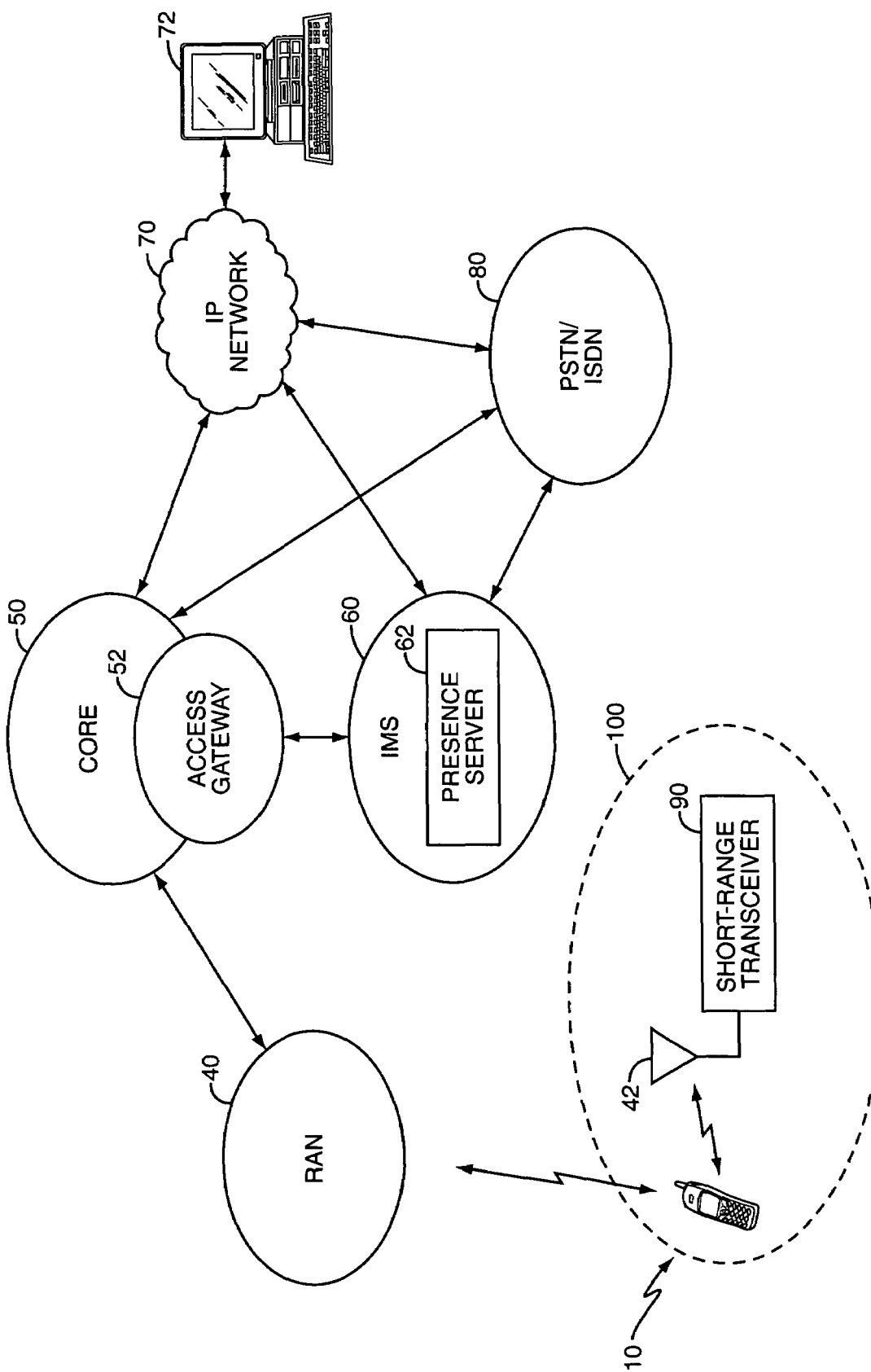
FIG. 2 illustrates a type of communications network in which the wireless communications device of FIG. 1 may operate.

Short-range transceiver 34 and antenna 36 allow a user to communicate wireless signals to and from a corresponding short-range transceiver 90 (FIG. 2). In one embodiment, short-range transceiver 34 is a BLUETOOTH transceiver or RF transceiver operating according to the IEEE 802.11(b) or 802.11(g) standards. As is well known in the art, BLUETOOTH is a universal radio interface that permits the creation of ad hoc networks, and is particularly well-suited for communications over short distances. It should be understood, however, that short-range transceiver 34 may utilize any technology known in the art operable to transmit and receive signals over short distances, for example, infra-red, and hardwired cables.

FIG. 2 illustrates the main functional elements of a communications network in which wireless communications device 10 may operate. The wireless network may, for example, comprise a GSM/GPRS network, cdma2000 network, or Wideband CDMA network. The wireless network comprises a radio access network (RAN) 40, a core network (CN) 50, and an IP Multimedia Subsystem (IMS) 60. The RAN 40 supports radio communications with wireless communication device 10 over an air interface. The wireless network typically includes more than one RAN 40 though only one is shown in FIG. 2.

The CN 50 provides a connection to an IP network 70, such as the Internet or other packet data network (PDN) for packet switched services, and may provide a connection to the Public Switched Telephone Network (PSTN) and/or the Integrated Digital Services Network (ISDN) 80 for circuit-switched services, such as voice and fax services. The CN 50 also includes an access gateway 52 for interconnecting with the IMS 60. The access gateway 52 may be, for example, a GPRS Gateway Serving Node (GGSN) for GPRS networks or a Packet Data Serving Node (PDSN) for cdma2000 networks.

The IMS 60 provides access independent, IP-based multimedia services such as voice over IP (VoIP) to mobile subscribers. In addition, IMS 60 may include a presence server (PS) 62 that receives presence status updates from wireless communications device 10, and publishes the status updates to one or more remote parties. The remote parties may be, for example, a user of a personal computer 72 connected to the IP network 70, or another wireless communications device 10 communicating with RAN 40.

The IMS 60 uses open interfaces and an access independent session control protocol (SCP), such as the Session Initiation Protocol (SIP), to support multi-media applications and presence notification. SIP is an application layer control protocol for establishing, modifying, and terminating communication sessions between one or more participants. These sessions may include, for example, Internet multimedia conferences, Internet telephony calls, multimedia distributions, and network gaming. As described later in more detail, SIP has also been extended for instant messaging and presence services. The SIP is described in the Internet Engineering Task force (IETF) document RFC 3261. While a preferred embodiment of the invention as described herein uses the SIP, those skilled in the art will appreciate that the present invention may be employed with other SCPs as well. Another well-known protocol comparable to the SIP is H.323.

The communications network may also comprise a short-range transceiver 90 coupled to an antenna 92. As seen in FIG. 2, short-range transceiver 90 is associated with a predefined zone 100, and communicates with short-range transceiver 34 in wireless communications device 10. In one embodiment, short-range transceiver 90 is also a BLUETOOTH transceiver or RF transceiver operating according to the IEEE 802.11(b) or 802.11(g) standards. Generally, short-range transceiver 90 detects when wireless communications device 10 is proximate zone 100 and establishes a communications link with wireless communications device 10. Alternatively, however, short-range transceiver 34 may detect short-range transceiver 90 and establish the communications link.

Zone 100 is generally a predefined area in which wireless communications device 10 may be located. By way of example, zone 100 might be a "quiet zone," such as a church, a library, or meeting room. Additionally, zone 100 might be defined as the passenger area of a user's vehicle. In these types of scenarios, zone 100 might dictate the manner in which a user is able to operate wireless communications device 10. For example, where zone 100 is a "quiet zone," a user might be permitted to send and/or receive instant messages, but not place or receive telephone calls. While driving a car, the user might be able to place and receive phone calls (e.g., using a hands-free headset), but not able to send or receive instant messages.

As previously stated, presence status as currently defined might not accurately reflect a user's (or presentity's) ability to send and receive text messages under some circumstances.

For example, a presentity in a meeting might be reported as "Inactive" simply because the presentity has not used his or her phone for some predetermined time period. However, the presentity may still be willing and able to receive and/or respond to text messages. According to the present invention, therefore, the presentity is provided with a new presence status by zone 100 that is appropriate for zone 100. The presentity's wireless communications device 10 automatically changes its presence status to reflect the newly received presence status, and publishes the status change to subscribed watchers.

Figure 3:
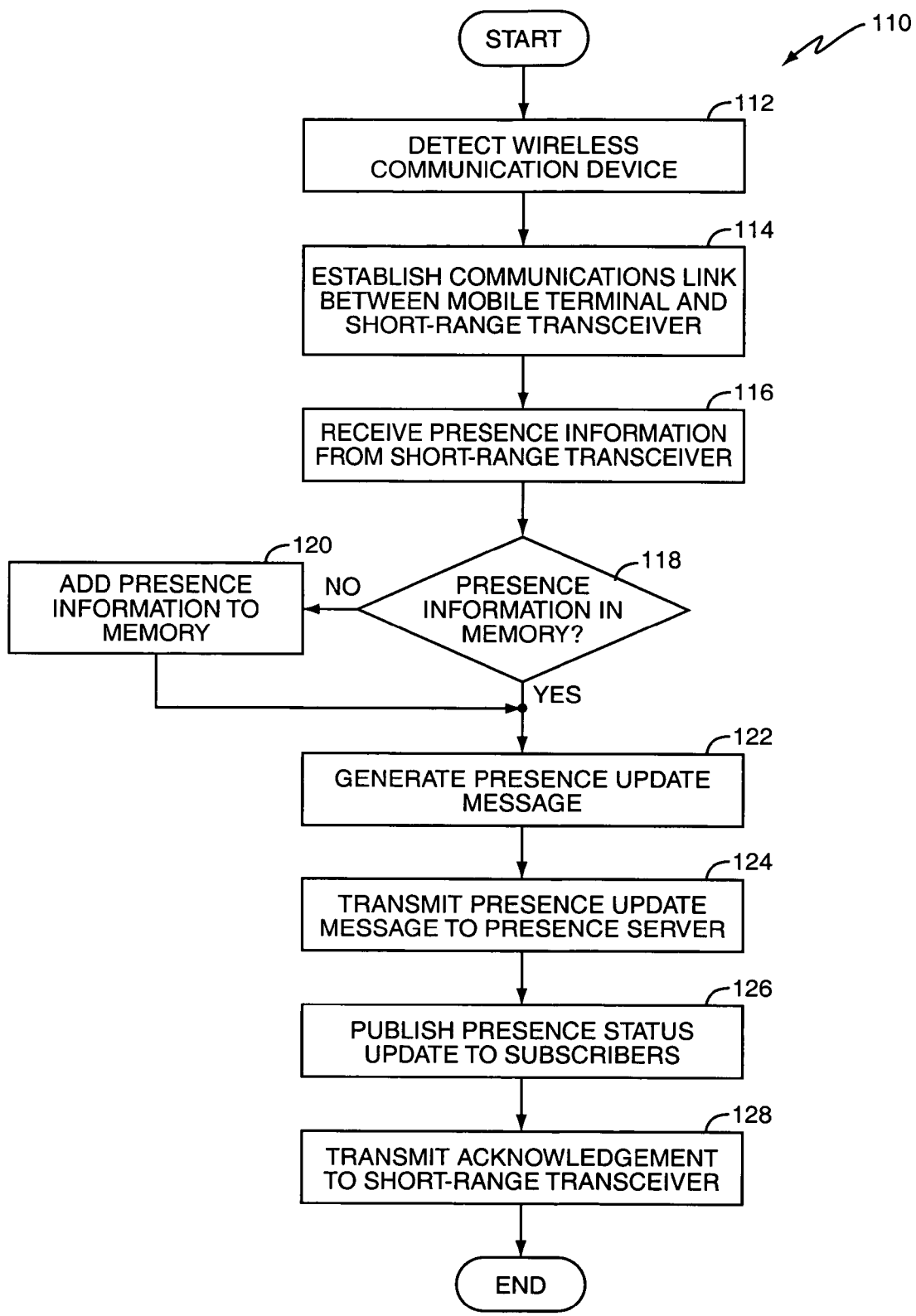
FIG. 3 illustrates a method by which a wireless communications device configured according to one embodiment of the present invention changes its presence status.

FIG. 3, for example, illustrates a method 110 by which a presentity's wireless communications device 10 updates its presence status and publishes the new presence status to one or more subscribed watchers according to one embodiment of the present invention. The method begins when short-range transceiver 90 associated with zone 100 detects wireless communications device 10 (box 112). Alternatively, wireless communications device 10 may detect short-range transceiver 90. A communications link is than established between wireless communications device 10 and short-range transceiver 90. By way of example, the communications link might comprise a short-range communications link where short-range transceivers 34 and 90 are BLUETOOTH transceivers.

Once the communications link is established, short-range transceiver 90 may push the presence information associated with zone 100 to wireless communications device 10 (box 116). Alternatively, wireless communications device 10 may request the presence information from short-range transceiver 90. The presence information may include, for example, a new presence status that is appropriate for zone 100 and an icon or other graphical representation of the new presence status. By way of example, the presence status may be "RECEIVE TEXT ONLY" indicating that a presentity may receive but not send text messages. This would let the watchers know that the presentity is in a location, such as a quiet zone, for example, where the presentity can only receive text messages. Other presence statuses may also be sent. The presence information may be sent as text to the presentity, or may be an indicator such as a numerical code or predefined label that represents the new presence status.

Upon receipt of the presence information, processor 26 automatically compares the new presence status to entries in the presence status table 24b already stored in memory 24 (box 118). If the new presence status is not listed in presence table 24b, processor 26 automatically updates the presence status table 24b to include the new presence status (box 120). Processor 26 than automatically generates a presence status update message, such as a SIP NOTIFY message, to notify the watchers of the status change (box 120). The generated message may include the text or other indicator of the new presence status received from short-range transceiver 90. Wireless communications device 10 sends the message to presence server 62 via RAN 40 and CN 50 (box 124). As is known in the art, presence server 62 might then publish the presentity's new presence status to the watchers (box 126). The watchers receiving the notification of the presentity's new presence status may view the new presence status and/or icon on their displays. Wireless communications device 10 may also send an acknowledgement message to short-range transceiver 90 indicating that the new presence status has been received and published to the watchers (box 128).

Figure 4:
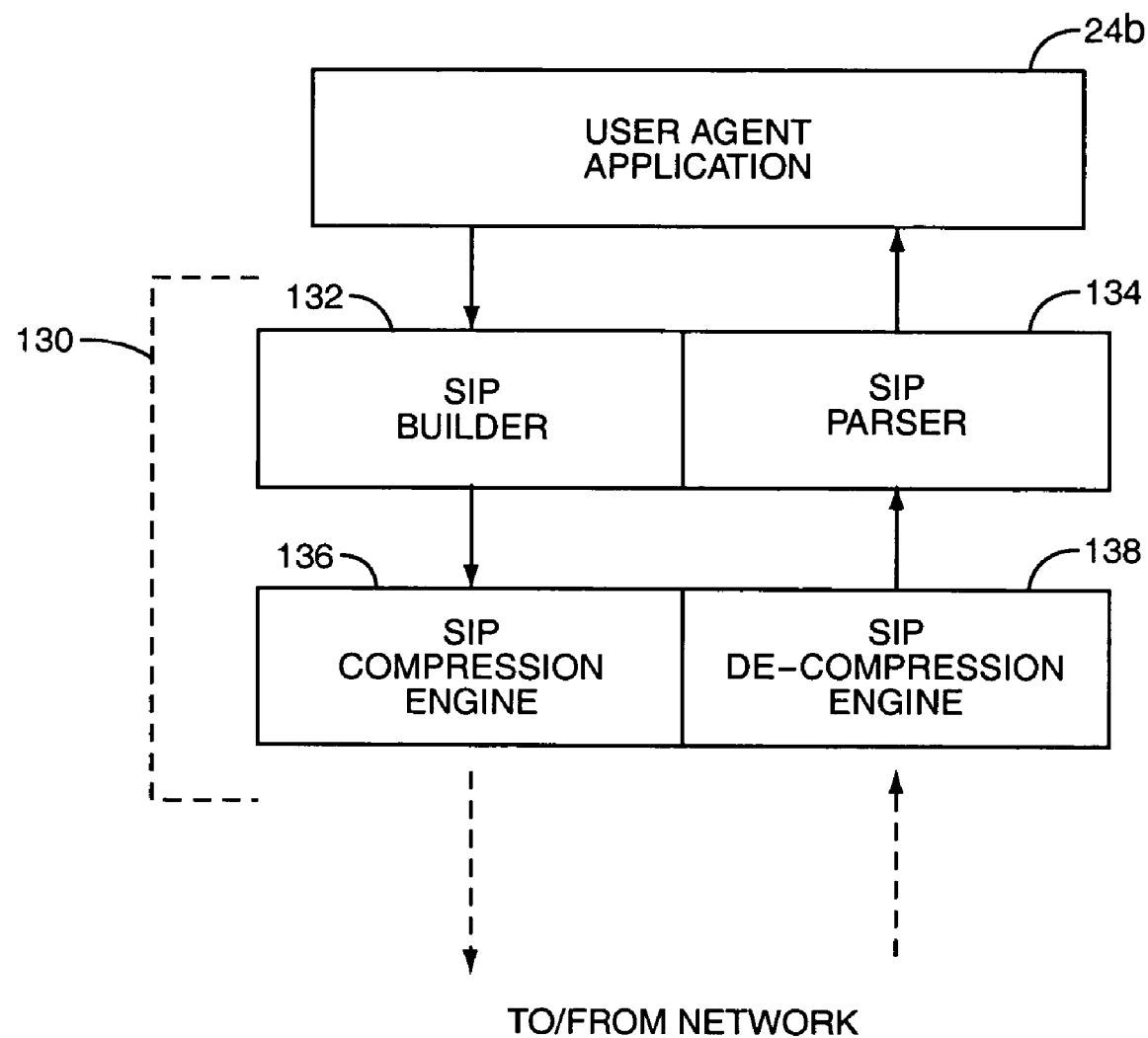
FIG. 4 illustrates a user agent application and associated SIP client used to send and receive presence updates according to one embodiment of the present invention.

As seen in FIG. 4, wireless communications device 10 may include a user agent application 24a to facilitate the automatic presence status update of FIG. 3. User agent application 24a is typically executable software that may be developed in any well-known computer language including, but not limited to, C/C++ and Java. In the illustrated embodiment, wireless communications device 10 uses SIP to communicate with the presence server 62 in the IMS 60. Therefore, user agent application 24b might interface with a SIP client 130 also resident on wireless communications device 10. SIP client 130 may include various functional elements such as a SIP builder 132, a SIP parser 134, a SIP compression engine 136, and a SIP de-compression engine 138. Other elements may also be included; however, as SIP clients are generally well-known in the art, only a brief description is given here for context and clarity.

Generally, SIP builder 132 compiles binary-encoded message data provided by the user agent application 24b through a SIP engine (not shown). As is known in the art, the SIP engine may interface the user agent 24b and the SIP builder/parser 132, 134. The SIP builder generates the text-based SIP messages for transmission to a remote device, such as presence server 62. The SIP compression engine 136 compresses the generated text-based SIP message. Compression reduces the size of the SIP message for transmission to RAN 40 over the air interface. RAN 40 than forwards the SIP message to presence server 62 in IMS 60. The SIP engine may employ a state dictionary (not shown) stored in memory 24 to perform the compression.

The user agent application 24a may also update the presence status of the other users using SIP signaling. As is known in the art, SIP messages received from RAN 40 may be de-compressed and parsed to recover the SIP messages. Thus, user agent application 24a allows a user of wireless communications device 10 to notify subscribers of his or her new presence status, and to be notified of the presence status changes of other users.

As previously stated, SIP has been extended to support presence services. Because the present invention can make use of these existing extensions, the present invention does not require changes to the SIP protocol or signaling flow. For example, the present invention may employ a Rich Protocol Information Data (RPID) document to notify watchers of a presentity's new presence status. The RPID is described in the Internet Draft authored by H. Schulzrinne and entitled, "RPID—Rich Presence Extensions to the Presence Information Data Format (PIDF)," Jun. 2, 2005, which is incorporated herein in its entirety by reference. While a preferred embodiment of the invention as described herein uses the RPID, those skilled in the art will appreciate that the present invention may employ other documents as well.

Generally, the RPID is a protocol-agnostic document that is designed to transport presence information. The RPID may be, for example, an eXtensible Markup Language (XML) document that is transported with presence notification transactions. As such, protocols other than SIP may use the RPID to transport presence information. The RPID comprises one or more information elements that carry information. In one embodiment of the present invention, the "status-icon" element may be used to carry the presentity's new presence status. The "status-icon" element, as seen in the example below, may comprise a link pointing to an image that represents the new presence status of the presentity. The "status-icon" element may be sent as part of a NOTIFY message by the presentity, for example, upon receipt a watcher may use the information in this element to represent the presentity's status in a graphical environment.

<status-icon>http://www.zoneserver.com/rcv_txt_no_calls.gif</status-icon>

The RPID also includes other elements that may be used to carry the presentity's new presence status.

Thus, the present invention may be employed to automatically change a presentity's status to one that is appropriate for a given zone. Further, the present invention is not only limited to known presence statuses (i.e., those that are already defined), but allows the operator of proximity device 90 the flexibility to define new presence statuses that may be appropriate for a particular zone. For example, the above status-icon element includes a link to an image file on the operator's server that indicates that the presentity can receive, but not send, text messages. Other operator-defined statuses may include icons indicating that the presentity can send but not receive text messages. Those skilled in the art will appreciate that other statuses may be defined as needed or desired. This may be accomplished by simply updating presence server 62 to include the new presence status before sending the presence statuses to the users from short-range transceiver 90.

In addition, those skilled in the art will appreciate that while the present invention has been described using presence server 62, a presence server is not required. Rather, a presentity using a wireless communications device 10 configured according to the present invention may publish the new presence status directly to one or more remote parties via RAN 40 and CN 50.

Further, the foregoing description uses short-range transceivers 34, 90 to illustrate how wireless communications device 10 might detect that it is proximate zone 100, or alternatively, be detected. However, those skilled in the art will realize that this is for illustrative purposes only. Any proximity detectors known in the art may be substituted for short-range transceivers 34, 90.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of updating presence information at a wireless communications device comprising:
   detecting a proximity of a wireless communications device to a predefined zone;
   receiving presence information at the wireless communications device from a transmitter associated with the predefined zone, the presence information comprising a new zone-defined presence status being assigned to the wireless communications device via the transmitter;
   automatically changing a presence status of the wireless communications device to the new zone-defined presence status;
   determining, at the wireless communications device, whether the new zone-defined presence status received from the transmitter is defined in memory of the wireless communications device; and
   updating the memory of the wireless communications device to include the new zone-defined presence status if the new zone-defined presence status is not defined in the memory of the wireless communications device.

2. The method of claim 1 further comprising:
   generating, at the wireless communications device, a presence update message to include the new zone-defined presence status of the wireless communications device; and
   publishing the new zone-defined presence status of the wireless communications device to a remote entity via a wireless communications network.

3. The method of claim 2 wherein the presence update message comprises an information element that indicates the new zone-defined presence status to the remote entity.

4. The method of claim 1 further comprising transmitting an acknowledgement message to a receiver associated with the predefined zone.

5. The method of claim 1 wherein detecting a proximity of a wireless communications device to a predefined zone comprises detecting a short-range transceiver associated with the predefined zone.

6. The method of claim 5 wherein receiving presence information at the wireless communications device comprises receiving the presence information over a short-range communications link established between the wireless communications device and the short-range transceiver.

7. A wireless communications device comprising:
   a proximity transceiver configured to detect a proximity of the wireless communications device to a predefined zone;
   a user agent configured to receive presence information from a transmitter associated with the predefined zone, the presence information defining a new zone-defined presence status being assigned to the wireless communications device via the transmitter;
   a controller configured to:
      automatically change a presence status of the wireless communications device to the new zone-defined presence status; and
      update a memory of the wireless communications device to include the new zone-defined presence status if the new zone-defined presence status is not defined in the memory of the wireless communications device.

8. The wireless communications device of claim 7 wherein the controller is further configured to generate a presence update message to include the new zone-defined presence status of the wireless communications device.

9. The wireless communications device of claim 8 further comprising a transceiver configured to publish the presence update message to a remote entity via a wireless communications network.

10. The wireless communications device of claim 9 wherein the presence update message comprises an information element that indicates the new zone-defined presence status to the remote entity.

11. The wireless communications device of claim 7 wherein the proximity transceiver is further configured to transmit an acknowledgement message to a receiver associated with the predefined zone responsive to the automatic change in the presence status of the wireless communications device.

12. The wireless communications device of claim 7 wherein the controller is further configured to automatically restore the wireless communications device from the new zone-defined presence status to a previous presence status when the wireless communications device is no longer proximate the predefined zone.

13. The wireless communications device of claim 7 wherein the proximity transceiver comprises a short-range transceiver.

* * * * *